Jan. 12, 1926.  1,569,717

J. P. COLGAN

GLARESHIELD FOR MOTOR VEHICLES

Filed Jan. 25, 1924

Inventor
John P. Colgan.

By Lacy & Lacy, Attorneys

Patented Jan. 12, 1926.

1,569,717

UNITED STATES PATENT OFFICE.

JOHN P. COLGAN, OF WAYCROSS, GEORGIA.

GLARESHIELD FOR MOTOR VEHICLES.

Application filed January 25, 1924. Serial No. 688,516.

*To all whom it may concern:*

Be it known that I, JOHN P. COLGAN, citizen of the United States, residing at Waycross, in the county of Ware and State of Georgia, have invented certain new and useful Improvements in Glareshields for Motor Vehicles, of which the following is a specification.

This invention relates to an improved glare shield for motor vehicles and seeks, among other objects, to provide a device which may be mounted upon a vehicle near the front end thereof in such position that the headlights of an oncoming car will cause the device to throw a shadow against the wind shield of the vehicle in front of the driver to thus protect the driver from the glare of said headlights.

The invention seeks, as a further object, to provide a device wherein the light screen employed may be adjustably elevated to suit the requirements of different cars.

And the invention seeks, as a still further object, to provide a device well adapted for general use and which may be readily installed.

Other and incidental objects will appear hereinafter.

Figure 1:
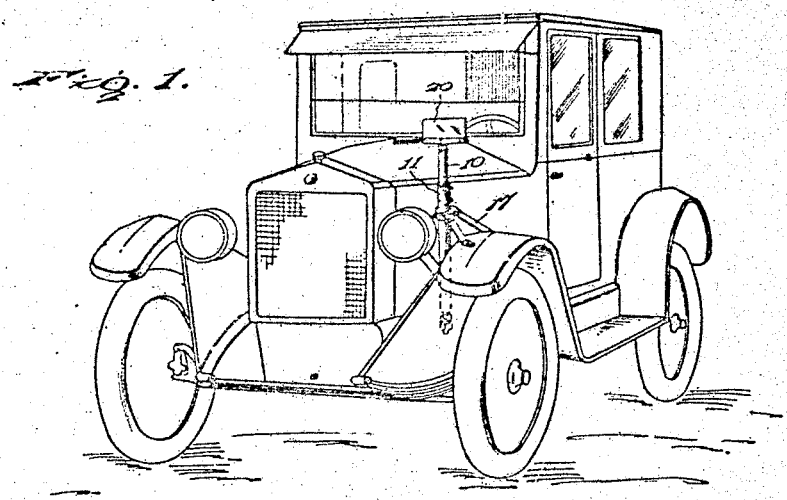
Figure 1 is a perspective view showing my improved device applied to a conventional motor vehicle.
Figure 2:
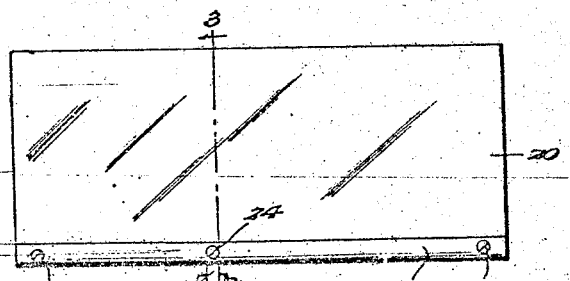
Figure 2 is an enlarged detail elevation of the device, parts being shown in section.
Figure 3:
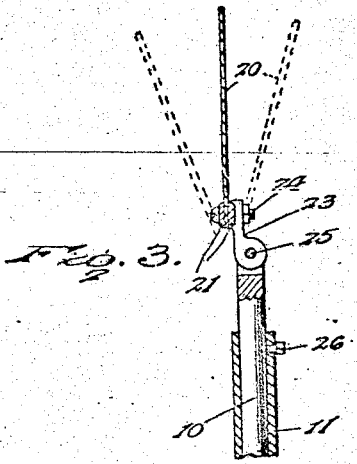
Figure 3 is a detail sectional view on the line 3—3 of Figure 2, looking in the direction of the arrows.
Figure 4:
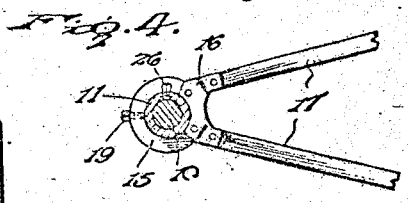
Figure 4 is a detail horizontal sectional view on the line 4—4 of Figure 2, looking in the direction of the arrows.

In carrying the invention into effect, I employ a supporting post or standard comprising an upper section 10 and a tubular lower section 11 slidably receiving the upper section. At its lower end, the section 11 terminates in a stud 12 which is threaded to accommodate a nut 13. In use, the device is, as best shown in Figure 1 of the drawings, mounted at the left hand side of the vehicle between the engine hood and the left front fender and is preferably arranged as far forwardly as possible since I have found that the best results are obtained by mounting the device as far as possible in front of the wind shield. As suggested in Figure 2, a hole may be bored through the left frame bar of the vehicle chassis as well as through any overlying part to accommodate the stud 12 when the nut 13 is applied for rigidly securing the post in upright position. Surrounding the section 11 of the post is a collar 15 to which is attached a yoke plate 16 and secured to the ends of said plate are diverging brace rods 17. At their free ends, these rods are bolted or otherwise secured to the left fender of the vehicle, as indicated at 18, and in order that the brace rods may be positioned to conform to the varying height of the left fenders of different vehicles, the collar 15 is slidable along the section 11 of the post and is equipped with a set bolt 19 for securing the collar in adjusted position.

Arranged upon the section 10 of the post is a light screen 20 which may be formed from a piece of colored celluloid or other approved translucent material and mounting the screen is a pair of cleats 21 clamping the lower margin of the screen therebetween, the cleats being removably connected with each other by clamping screws 22. Thus, should the efficiency of the screen become impaired, a new screen may be readily substituted therefor. Fitting one of the cleats is a knuckle 23 detachably secured by a bolt 24 extending through both cleats and, as will be observed, the knuckle is preferably arranged near the right hand end of the screen. The upper end of the section 10 of the post is slotted to receive the knuckle and extending through the post and through said knuckle is a bolt 25 pivotally mounting the screen. Accordingly, the screen may be adjustably swung either forwardly or rearwardly when said bolt may be tightened for securing the screen in adjusted position. Furthermore, the section 10 of the post may be adjustably elevated upon the section 11 thereof, so that the light screen may be brought to the desired height with respect to the vehicle wind shield, and screwed through the post section 11 are set bolts 26 securing the section 10 in elevated position. Thus, in the glare of the headlights of an approaching car, the light screen 20 will be disposed to throw a shadow against the vehicle wind shield in front of the driver for protecting the eyes of the driver from said glare and it has been found that the driver may, by remaining in the shadow of the light screen, clearly see the roadway without hindrance by the headlights of the oncoming car. I accordingly provide a particularly efficient device for the purpose set forth and, as will now be appreciated, a device which may be readily applied.

Having thus described the invention, what I claim is:

1. A glare shield for motor vehicles including a supporting post terminating at its lower end in a stud to extend through the frame bar of a vehicle at a point adjacent one of the front fenders of the vehicle, means engaged with said stud for securing the post in upright position, means to extend between the upper portion of the post and an adjacent part of the vehicle bracing the post, and a light screen carried by the post in a position to cast a shadow against the vehicle windshield in front of the driver's seat of the vehicle by the illumination of the headlights of an oncoming car.

2. A glare shield for motor vehicles including a supporting post for attachment to a vehicle near the front thereof, a collar surrounding the post, means for securing the collar in adjusted position vertically of the post, brace rods fixed to the collar and disposed for attachment to an adjacent fender of the vehicle supporting the post in upright position, and a light screen carried by the post in a position to cast a shadow against the vehicle windshield in front of the driver's seat of the vehicle by the illumination of the headlights of an oncoming car.

3. The combination with a motor vehicle having a windshield, of an upstanding post fixed to the forward portion of the vehicle adjacent one of the front fenders thereof, and a light screen supported by said post near the level of the windshield and disposed to cast a shadow against said windshield in front of the driver's seat of the vehicle by the illumination of the headlights of an oncoming car.

In testimony whereof I affix my signature.

JOHN P. COLGAN. [L. S.]